J. C. SMITH.
COUPLING NIPPLE.
APPLICATION FILED AUG. 28, 1919.
1,385,157.
Patented July 19, 1921.
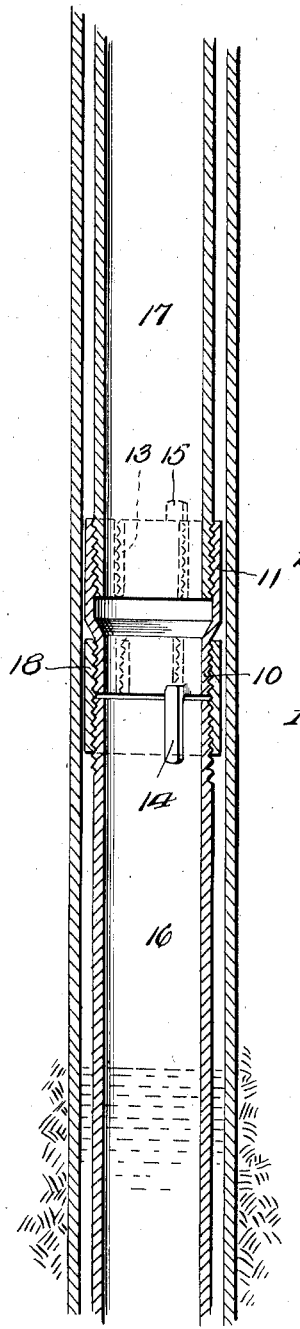
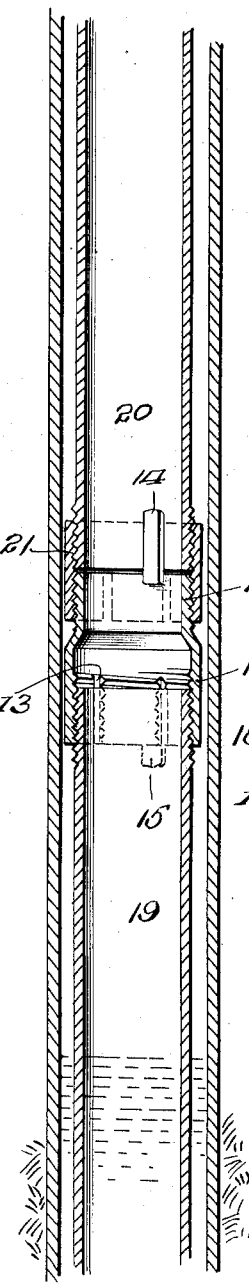
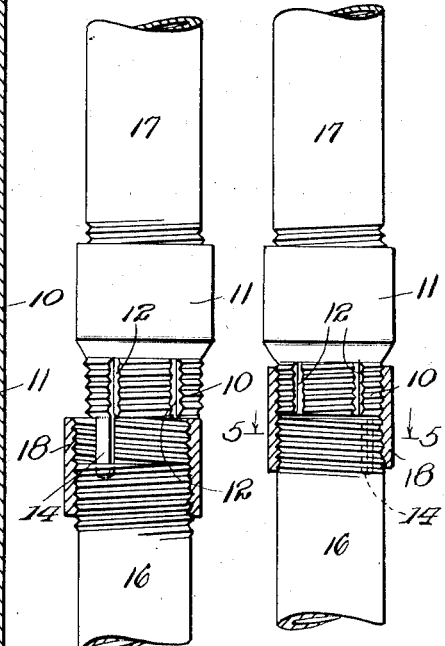
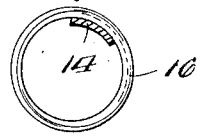
Inventor
J. C. Smith.
by Lacey & Lacey,
Attorneys

UNITED STATES PATENT OFFICE.

JAMES C. SMITH, OF TULSA, OKLAHOMA.

COUPLING-NIPPLE.

1,385,157.  Specification of Letters Patent.  Patented July 19, 1921.

Application filed August 28, 1919. Serial No. 320,383.

*To all whom it may concern:*

Be it known that I, JAMES C. SMITH, citizen of the United States, residing at Tulsa, in the county of Tulsa and State of Oklahoma, have invented certain new and useful Improvements in Coupling-Nipples, of which the following is a specification.

This invention relates to an improved coupling nipple for deep well casings.

It sometimes happens when pulling a casing that, owing to severe strain, adjacent sections of the casing will separate at the joint therebetween. In some instances, the upper section becomes disengaged from the joint collar while in other instances the joint collar becomes disengaged from the lower section. The present invention, therefore, has as one of its principal objects to provide a coupling nipple which may be connected to the upper section and used in either of the contingencies mentioned for again connecting the upper section to the lower section whereby the pulling operation of the casing may be completed.

The invention has as a further object, as may be perceived from the foregoing object, to provide a coupling nipple which will be double ended, one end being internally threaded for engagement around a casing section and the other end being reduced and externally threaded for engagement within a casing joint collar.

When the casing sections separate as above stated, the threads of the casing section and of the joint collar are generally mashed and distorted or otherwise mutilated and a further object of the invention is to provide a coupling nipple, the threads of which will be so formed that they will plow their way between the threads of a casing section or joint collar.

And the invention has as a still further object to provide a coupling nipple equipped with centering means adapted to coact with a casing section whereby the free end of said section may be brought into register with the nipple for engagement thereby.

Other and incidental objects will appear hereinafter.

In the drawings:

Figure 1 is a vertical sectional view showing my improved coupling nipple in use with its smaller end presented downwardly, Fig. 2 is a view similar to Fig. 1, but showing the nipple with its larger end presented downwardly, Figs. 3 and 4 are side elevations illustrating the use of the centering lugs upon the nipple, and Fig. 5 is a transverse sectional view taken on the line 5—5 of Fig. 4 and looking in the direction of the arrows.

In carrying the invention into effect, I employ a double ended nipple having an end portion 10 of one diameter and an end portion 11 of a somewhat larger diameter, the coupling being preferably drop forged. The end portion 10 is externally threaded for engagement within a casing joint collar and said threads are interrupted by a plurality of transverse channels 12 whereby the ends of these threads at the channels will be adapted to act as cutters and plow between the threads of the casing joint collar, shaving away the mashed or projecting rough surface of the collar threads. The larger end portion 11 of the nipple is internally threaded for engagement around a casing and these threads, like the threads of the smaller end portion of the nipple, are, for a similar purpose, also interrupted by a plurality of transverse channels 13. Extending longitudinally from the smaller end portion of the nipple at its inner side is an arcuate centering lug 14 conforming in its transverse curvature to the curvature of said end portion. The larger end portion 11 of the nipple is provided with a similar centering lug 15 which extends longitudinally from the end edge of this latter end portion and in its transverse curvature conforms thereto. The lug 14 is somewhat longer than the lug 15 and is arranged with its outer face lying flush with the inner face of the end portion 10. On the other hand, the lug 15, being extended from the end edge of the end portion 11, is arranged with its inner face substantially flush with the inner face of this latter end portion.

In Fig. 1, I have shown my improved coupling nipple in use in connection with a lower casing section 16 and an upper casing section 17, the lower section carrying a joint collar 18, it being assumed that the upper section has been pulled out of said collar. For coupling the sections, my improved nipple is first threaded at its larger end around the adjacent end of the section 17 of the casing when this casing section with the nipple thereon is lowered into the well and rotated to engage the smaller end portion of the nipple within the collar 18. The pulling operation of the casing may then be completed.

In Fig. 2, I have shown the use of the nipple in connection with a lower casing section 19, upper casing section 20, and joint collar 21 carried by the upper section, it being assumed that the joint collar has been pulled from the lower section. In this instance, the smaller end portion of the nipple is first threaded into the collar when the section 20 is lowered and rotated to engage the larger end portion of the nipple around the casing section 19. The pulling operation of the casing may then be completed.

In Figs. 3 and 4, I have illustrated the use of the centering lugs upon the nipple. It sometimes happens that the upper end of the lower casing section will lean toward one side of the well, making it necessary to bring this lower casing section into alinement with the upper casing section before the nipple can be engaged with the lower casing section. In Fig. 3, the lower casing section 16 is shown as leaning to one side. In this event, the upper casing section is lowered until the smaller end portion 10 of the nipple abuts the collar 18 when the centering lug 14 will project within the lower casing section in position to coact with the inner face thereof. Consequently, by then supporting the upper casing section to rotate about a vertical axis, the lug 14 will, when the upper casing section is turned, ride around the inner face of the lower casing section at its upper end for swinging the lower casing section into alinement with the upper section, when continued turning of the upper section will serve to engage the end portion 10 of the nipple within the collar. When the nipple is reversed end for end as shown in Fig. 2, the centering lug 15 will be adapted to ride around the outer face of the lower casing section in a manner similar to that just described in connection with the lug 14 for centering the lower casing section 19 with respect to the upper casing section 20. In this connection it is to be particularly observed, as brought out in Fig. 5, that since the lug 14 is transversely curved to conform to the curvature of the inner face of the end portion 10 of the nipple, said lug will seat flat against the inner face of the lower casing section to prevent teetering of the lower section of the casing upon the lug while the lug 15 will when brought into use, be adapted to seat flat against the outer face of the lower casing section to likewise prevent teetering of said section. It will accordingly be seen that I provide a very effective type of coupling nipple.

Having thus described the invention, what is claimed as new is:

1. A coupling nipple of the character described comprising a double ended nipple body internally threaded at one end and exteriorly threaded at its opposite end, the threaded portions being interrupted by channels transverse to the threads.

2. A coupling nipple of the character described including a double ended nipple body provided at each end thereof with centering means, the centering means at one end of the body being adapted to engage the inner surface of a joint collar and the centering means at the opposite end of the body being adapted to engage the outer surface of a tube section.

3. A coupling nipple of the character described, including a double ended nipple body having centering lugs projecting longitudinally from the ends thereof, the body being internally threaded at one end and exteriorly threaded at its opposite end and the threaded portions being interrupted by channels transverse to the threads.

4. A coupling nipple of the character described including a double ended nipple body having its end portions of different diameters, and centering lugs projecting longitudinally from the ends of the body, the lug at the smaller end of the body having its outer face flush with the inner face of the body and the lug at the larger end of the body having its inner face flush with the inner face of the body.

In testimony whereof I affix my signature.

JAMES C. SMITH. [L.S.]